(12) United States Patent
Patibandla

(10) Patent No.: US 8,178,155 B2
(45) Date of Patent: May 15, 2012

(54) CARBON-BASED ULTRACAPACITOR

(75) Inventor: Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 539 days.

(21) Appl. No.: 12/360,328

(22) Filed: Jan. 27, 2009

(65) Prior Publication Data

US 2010/0189881 A1 Jul. 29, 2010

(51) Int. Cl.
*B05D 5/12* (2006.01)

(52) U.S. Cl. ............ 427/77; 427/79; 427/450; 427/577; 427/590; 427/112; 427/113; 427/122; 427/249.1; 427/249.4; 427/249.5; 427/249.16

(58) Field of Classification Search .................. 264/642, 264/643, 134, 135, 136, 137, 29.5, 29.1, 264/29.2, 29.3, 29.4, 29.6, 29.7, 104, 105; 427/77, 79, 450, 577, 590, 112, 113, 122, 427/249.1, 249.4, 249.5, 249.15, 249.16

See application file for complete search history.

(56) References Cited

U.S. PATENT DOCUMENTS

| | | | | |
|---|---|---|---|---|
| 4,066,823 A | * | 1/1978 | Armstrong | 429/522 |
| 4,832,881 A | * | 5/1989 | Arnold et al. | 264/29.7 |
| 4,873,218 A | | 10/1989 | Pekala | |
| 4,900,588 A | | 2/1990 | Tajima et al. | 427/122 |
| 4,997,804 A | | 3/1991 | Pekala | |
| 5,260,855 A | | 11/1993 | Kaschmitter et al. | |
| 5,290,592 A | | 3/1994 | Izuchi et al. | 427/203 |
| 5,636,437 A | * | 6/1997 | Kaschmitter et al. | 29/825 |
| 5,898,564 A | | 4/1999 | Mayer et al. | |
| 6,493,209 B1 | | 12/2002 | Kamath et al. | |
| 2003/0108785 A1 | | 6/2003 | Wu et al. | 429/44 |
| 2003/0143463 A1 | * | 7/2003 | Yoon et al. | 429/231.4 |
| 2008/0048153 A1 | | 2/2008 | Naoi | |
| 2008/0241664 A1 | * | 10/2008 | Nanjundaswamy et al. | 429/128 |

OTHER PUBLICATIONS

Burket, C.L., et al., "Overcoming the Barrier to Graphitization in a Polymer-Derived Nanoporous Carbon", *Carbon*, 2008, pp. 1-10.
Burket, C.L., et al., "Synthesis of Nanoprous Carbon with Pre-Graphitic Domains", *Carbon*, vol. 45, 2007, pp. 2307-2320.
Naoi, K., et al., "New Materials and New Configurations for Advanced Electrochemical Capacitors", *The Electrochemical Soc. Interface*, Spring 2008, pp. 34-37.

(Continued)

*Primary Examiner* — Jeffrey Wollschlager
*Assistant Examiner* — Stella Yi
(74) *Attorney, Agent, or Firm* — Mark J. Danielson; Pillsbury Winthrop Shaw Pittman LLP

(57) ABSTRACT

A method of manufacturing a high surface area per unit weight carbon electrode includes providing a substrate, depositing a carbon-rich material on the substrate to form a film, and after the depositing, activating the carbon-rich material to increase the surface area of the film of carbon-rich material. Due to the activation process being after deposition, this method enables use of low cost carbon-rich material to form a carbon electrode in the capacitor. The electrode may be used in capacitors, ultracapacitors and lithium ion batteries. The substrate may be part of the electrode, or it may be sacrificial—being consumed during the activation process. The carbon-rich material may include any of carbonized material, carbon aerogel and metal oxides, such as manganese and ruthenium oxide. The activation may include exposing the carbon-rich material to carbon dioxide at elevated temperature, in the range of 300 to 900 degrees centigrade. This method may be used to make both symmetric and asymmetric ultracapacitors.

20 Claims, 6 Drawing Sheets

OTHER PUBLICATIONS

Rajagopalan, R., et al., "Novel Nanoporous Carbon Derived from Coal Tar Pitch/Polyethylene Glycol Diacid Blends as Electrodes for Ultracapacitors", *Mater. Res. Sco. Symp. Proc.*, vol. 973, 2007, pp. 1-5.

Signorelli, R., et al., "Carbon Nanotube Enhanced Ultracapacitor", *MIT Poster Presentation*, downloaded from http://www.lees-web.mit.edu/lees/projects/cnt_ultracapacitor_project.htm, Jan. 23, 2008, 1 page.

Zhou, C., "Carbon Nanotube Based Electrochemical Supercapacitors", Chapter 1, *Doctoral Thesis submitted to Georgia Institute of Technology*, Dec. 2006, pp. 1-35.

International Search Report and Written Opinion for PCT/US2010/021984 Issued Aug. 13, 2010.

* cited by examiner

CARBON-BASED ULTRACAPACITOR

FIELD OF THE INVENTION

The present invention relates generally to energy storage devices, and more specifically to low-cost fabrication methods for ultracapacitors.

BACKGROUND OF THE INVENTION

Large surface area per unit weight materials such as activated carbon are used as electrodes in a variety of applications, such as electrochemical double layer capacitors (EDLC), otherwise known as ultracapacitors, and lithium ion batteries. The carbon electrode surface is where charge exchange occurs with the electrolyte. In the case of an EDLC, charge separation occurs, not between the capacitor plates as such, but across the electrochemical double layer—typically on the order of nanometers thick. The very large surface area of an activated carbon electrode allows for very large capacitances and very high stored energy densities in EDLCs.

Activated carbon can simply be a powder-compact made up of extremely small and very "rough" particles; in bulk the particles fond a low-density compact of particles with holes between them that resembles a sponge. The activated particles can resemble a solid core surrounded by a shell with cracks. Overall the openings on the surface of particles, as well as those among them, lead to pores that are classified as micro (<2 nm), meso (2-50 nm) and macro (>50 nm) pores. See FIG. 2 for an example of an activated carbon particle 200, with a solid core 210 and "cracked" shell 220; the boundary, which is not necessarily as well defined as shown, between the core and shell is indicated by dashed line 230. The surface area of such activated carbon materials, measured by a method based on BET theory, ranges between 1000 and 2500 $m^2/g$. See S. Brunauer, P. H. Emmett and E. Teller, J. Am. Chem. Soc., 1938, vol. 60, pg. 309 for a discussion of BET theory.

Activated carbons are made from phenol resin, natural materials (coconut shells, wood), coal or oil pitch. Typically "carbonization" of such carbon-precursors followed by "activation" of the carbonized product are two distinct process steps. The processes currently used are time consuming, expensive, and result in low yield. The cost of EDLC grade activated carbon is in the range of $35-$100/kg, whereas the coal tar pitch or phenol resins costs less than $1 per kg.

In preparing an ultracapacitor, the EDLC-grade activated carbon is mixed with: typically 5 to 10 weight percent of binder materials, such as polyvinyledene, polytetrafluoroethylene, and/or Teflon®; an electrical conductivity enhancer, such as carbon black; and other additives, as required. This mixture may be ground, and/or ball-milled followed by dispersion in N-methylpyrrolidone (or similar) to form a slurry, or the mixture may be mixed with solvents such as isopropyl alcohol to form a paste, dough, or solution of desired viscosity (pliability). Often such mixing is done in an ultrasonic mixer. The slurry material is then applied to a metal foil, called a current collector, (typically aluminum or copper) on continuous winding machines to form electrodes. To ensure appropriate bonding between the slurry and the metal foil, some pressure is applied by passing the electrode between rollers—this process step is often referred to as "calendaring." Lastly, the solvent is evaporated, the binder is removed, and the electrode is dried, generally at a high temperature.

Even though the electrodes are processed from nano-scale, micro-pore activated carbon particles that have the potential to provide large surface areas per unit weight or volume, they are often processed using basic powder processing methodologies, as described above. This processing leads to a significant reduction in the useful surface area of the carbon material, yielding much lower than theoretically possible capacitances. For example, application of roller pressure in the calendaring step alone leads to a reduction in porosity of more than 50% and reduces the BET surface area down to 500 to 1000 $m^2/g$.

In conclusion, there is a need for improved processing techniques that provide activated carbon electrodes with surface areas closer to the theoretically calculated values. Such electrodes would provide a significant improvement in the stored energy density in EDLCs. Furthermore, there is a need for lower cost and higher yield processes for forming activated carbon and incorporating said activated carbon in an electrode. This would provide a significant cost reduction in EDLCs.

SUMMARY OF THE INVENTION

Embodiments of this invention are based on the concept of activating the carbon in a carbon electrode for an ultracapacitor after deposition of the carbon material, rather than using activated material to form the electrode. Due to the activation process being conducted after deposition, this method enables use of low cost carbon-rich material to form carbon electrodes for use in a family of ultracapacitors. A whole spectrum of inexpensive materials may be used, including oil/coal tar pitch, phenol resin and natural materials (coconut shells, rice husks, peanut shells, etc). The electrodes fabricated using the methods described herein may be incorporated into capacitors, symmetric and asymmetric ultracapacitors, batteries, and other devices that require carbon electrodes with very large surface areas per unit weight.

According to aspects of this invention, a method of manufacturing a high surface area per unit weight carbon electrode includes (1) providing a substrate, (2) depositing a carbon-rich material on the substrate, forming a film of carbon-rich material, and (3) after the depositing, activating the carbon-rich material to increase the surface area of the film of carbon-rich material. The electrode may be used in capacitors, ultracapacitors and lithium ion batteries. The substrate may be an electrode in the capacitor, or it may be sacrificial—being consumed during the activation process. The carbon-rich material may include any of carbonized material, carbon aerogel and metal oxides, such as manganese and ruthenium oxide. The activation may include exposing the carbon-rich material to carbon dioxide at elevated temperature, in the range of 300 to 900 degrees centigrade. This method may be used to make both symmetric and asymmetric ultracapacitors.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of this invention include forming an electrode following the method of: (1) depositing a carbon-rich material on a substrate to form a film of carbon-rich material; and (2) after the depositing, activating the carbon-rich material to increase the surface area of the film of carbon-rich material. Activating the carbon-rich material after foaming the electrode, rather than using activated material to form the electrode, allows the film of carbon-rich material to be made from lower-cost materials. The examples provided herein are directed to manufacturing ultracapacitor electrodes; however, the concepts are applicable to electrodes for other devices, for example anodes for lithium ion batteries.

Embodiments of this invention offer alternate lower-cost methods to synthesize and process ultracapacitor electrodes (both cathode and anode) and Li-ion battery anodes (which typically are made of carbon materials). The process may use inexpensive materials such as oil/coal tar pitch, phenol resin, and natural materials (coconut shells, rice husks, peanut shells, etc.).

Figure 1:
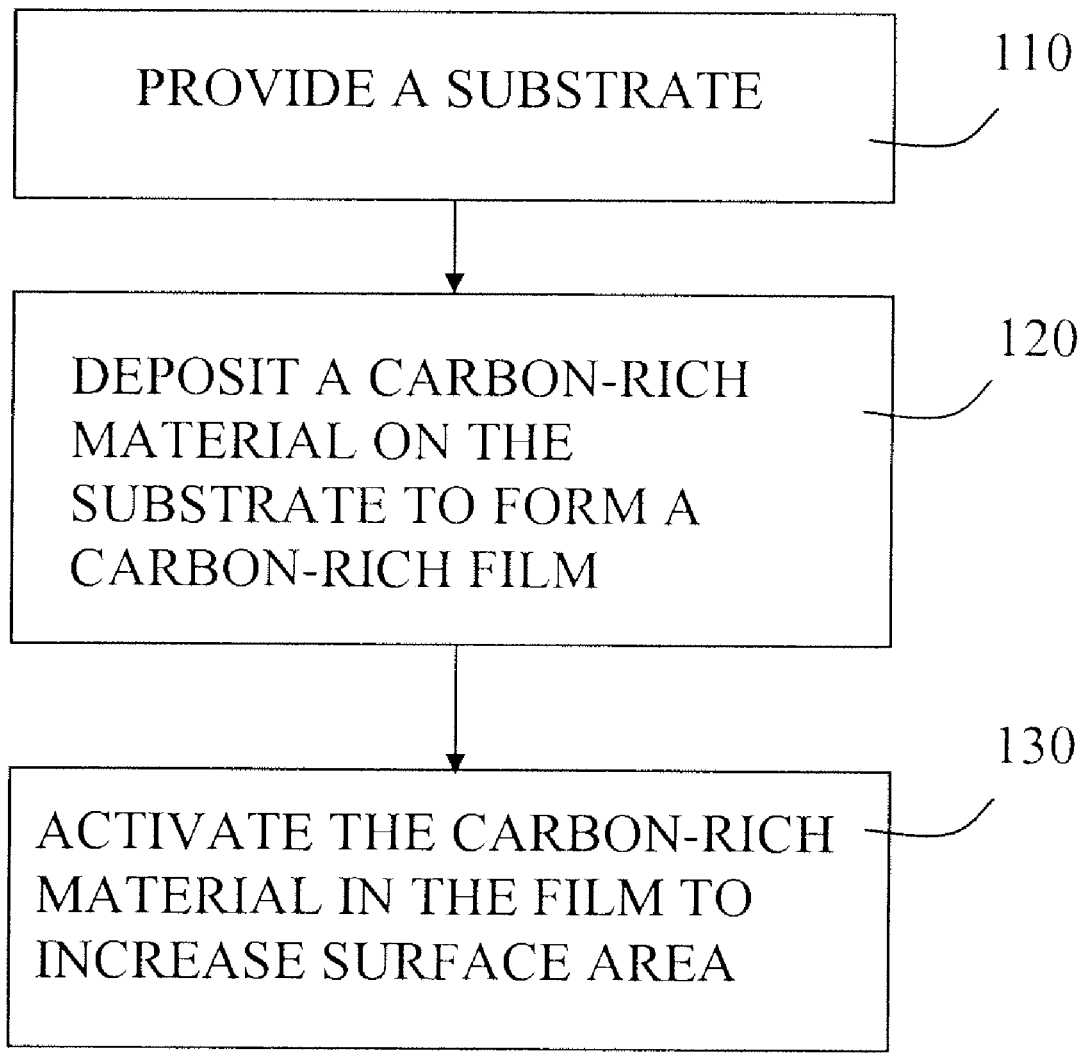
FIG. 1 is a flow chart, according to embodiments of the invention.
Figure 2:
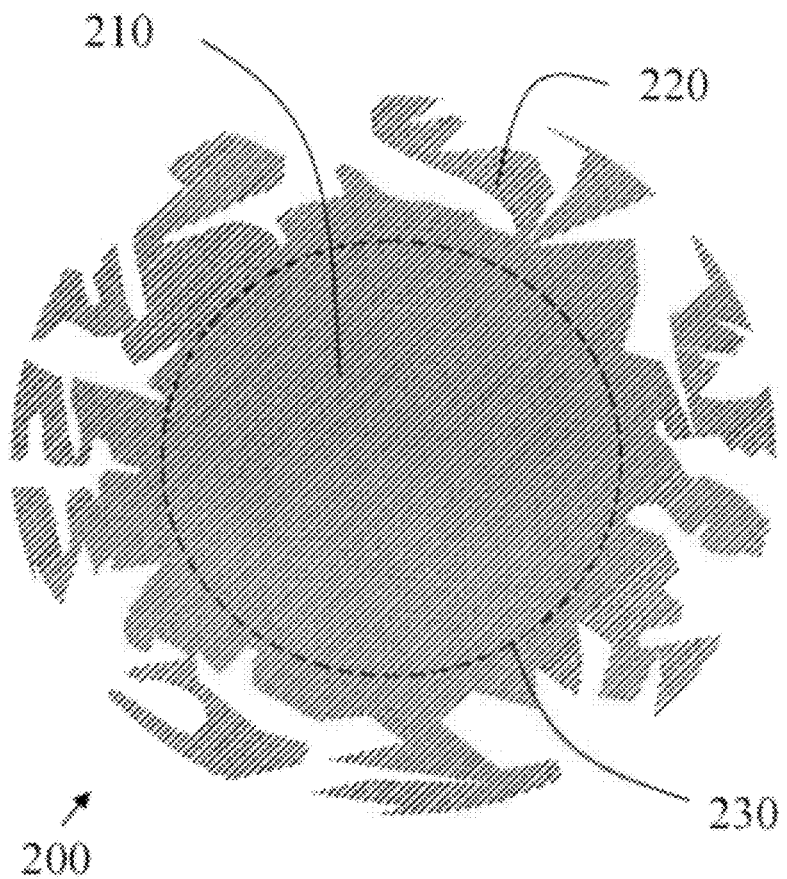
FIG. 2 is a cross-sectional representation of an activated carbon particle.

FIG. 1 shows the basic process flow for manufacturing a high surface area per unit weight carbon electrode, including: providing a substrate (110); depositing a carbon-rich material on the substrate to form a carbon-rich film (120); and activating the carbon-rich material in the film to increase the surface area (130). Carbon-rich material which is non-graphitizing when heated to high temperatures provides a better carbon-rich material suitable for activation. The substrate may be part of the electrode itself, and made of a metal such as aluminum or copper. Alternatively, the substrate may be sacrificial, and made of materials such as paper, cotton, silk, other fabrics or other fibrous materials. A sacrificial substrate may be consumed during the activating process. Note, in the case of a sacrificial substrate, a metal layer may be deposited on one surface of the carbon electrode after activation; the metal layer being a current collector.

A non-graphitizing carbon-rich material may be prepared as follows. Wash and clean the raw material, such as coal tar pitch, coconut shells, etc., in aqueous and/or organic solvents, as necessary to separate out undesirable contaminants. Dissolve the washed material in tetrahydrofuran (THF), or similar solvents, to form a solution/suspension. Filter the solution to separate the graphitizing and non-graphitizing portions—typically the residue (THF insoluble portion) is non-graphitizing and is better suited for making porous carbons, whereas the filtrate (THF soluble portion) graphitizes when heated to high temperatures, which is undesirable. THF insoluble tar pitch is mixed with PEG600 diacid and sulfuric acid, stirred and carbonized at or near 800 degrees C. Sulfuric acid is shown to accelerate polycondensation reactions of lighter volatile fractions in the pitch and create more insoluble fractions, which in turn, induces more disorder in the carbonized pitch.

The non-graphitizing carbon-rich material may then be prepared in a slurry for ease of application to a substrate, as follows. The carbonized material is mixed with binder and pore forming additives and low vapor pressure solvents (as necessary) to form a slurry. An example of a pore former is polyethylene glycol (PEG)—which is expected to increase the BET measured surface area while maintaining a narrow pore size distribution.

The slurry may then be applied to a substrate to form a high surface area electrode, as follows. The slurry is deposited on a substrate, such as a metal film using high speed roll to roll machines. The solvent is evaporated, the binder is removed, then the carbon in the film is activated. To activate the carbon, the following procedure may be followed. The pyrolyzed carbon is heated to temperatures up to 900° C., but generally lower, in an inert atmosphere (for example, nitrogen or argon gas), soaked in the inert gas at high temperature for 10 minutes to two hours (to drive off moisture and/or other volatile species, if any), followed by activation of the carbon under a carbon dioxide atmosphere at or below 900° C. It is known that after activation, carbon-rich materials such as coal tar pitch may have a BET surface area of about 1000-1500 $m^2/g$, with a significant density of micropores with diameters ranging from 1-2 nm. Furthermore, when a pore former like PEG is mixed with the modified pitch, pyrolyzed and activated using similar conditions, the surface area increases to 1500-2000 $m^2/g$, while maintaining a narrow pore size distribution of 1-2 nm. For further details of surface areas and pore sizes and densities, see: B. E Conway, Electrochemical Supercapacitors: Scientific, Fundamentals, and Technological Applications, Kluwer Academic, New York 1999; Novel Nanoporous Carbon Derived from Coal Tar Pitch/Polyethylene Glycol Diacid Blends as Electrodes for Ultracapacitors, R. Rajagopalan, K. Perez, and H. Foley, Mater. Res. Soc. Symp. Proc., 2007, vol. 973; New Materials and New Configurations for Advanced Electrochemical Capacitors, K. Naoi and P. Simon, The Electrochemical Society Interface, Spring 2008, pg. 34; Synthesis of nanoporous carbon with pre-graphitic domains, C. L. Burket, R. Rajagopalan, and H. C. Foley, Carbon, 2007, vol. 45, pg. 2307.

Activation of the carbon, as described above, may be varied as follows. The carbon may be activated in a wide range of gases such as inert, oxidizing or reducing gases; the choice of gas will depend upon the carbon material and the substrate material, among other variables. Furthermore, the procedure for activating the carbon, as described above, may be varied, depending on the substrate material. For example, if an aluminum substrate is used, the activation temperature should not exceed roughly half the melting point of the aluminum, which is 330 degrees centigrade. Therefore, the activation temperature for carbon on an aluminum substrate should be less than 330 degrees centigrade. The same general approach can be followed for other substrate materials, for example the activation temperature for carbon on a copper substrate should be less than 542 degrees centigrade. In general, carbon activation temperatures will be in the range of 300 to 900 degrees centigrade, depending on the substrate.

A number of variations of this process may be experimented with to optimize the process/device. For example, one may prepare the slurry using filtration-grade activated carbon or alternatively deposit TFH dissolved carbon onto the substrates followed by carbonization and carbon dioxide atmosphere activation. A further variation is to use calendaring during the deposition of the carbon-rich material on the substrate, in order to improve the adhesion of the carbon-rich material to the substrate.

Other embodiments of the invention include materials such as carbon aerogels. Aerogels are lightweight polymers that are extremely porous. They have extremely high surface areas and very low densities. Preparation of carbon aerogels is well know to those skilled in the art of ultracapacitors. For example, see U.S. Pat. Nos. 5,260,855, 4,997,804 and 4,873,218.

According to embodiments of the invention, aerogels may be integrated into the processing methodology described above. For example, the carbon aerogels may be ground up and incorporated into a slurry, and then processed as described above. Alternatively, very high surface area thin carbon aerogel layers may be formed directly on a substrate. These aerogel layers may then be activated, as described above, to form activated electrodes. These aerogel layers will have controllable densities, porosities, and pore sizes. The ideal pore size distribution would be one most suitable for the intended anion in the electrolyte used in the ultracapacitor. The process will be optimized to deposit thin (100 nm to several microns), uniform layers of continuous carbon aerogel material on a continuous spool-to-spool process line.

According to further embodiments of the invention, carbon nanotubes (CNTs) may be integrated into the processing methodology described above. CNTs may be mixed into the slurry and then activated on the surface of the electrode, as described above. Alternatively, CNTs may be grown directly on a substrate, and then activated following the procedure with physical high temperature and carbon dioxide activation, as described above. The CNTs may be grown on metal substrates.

Figure 3:
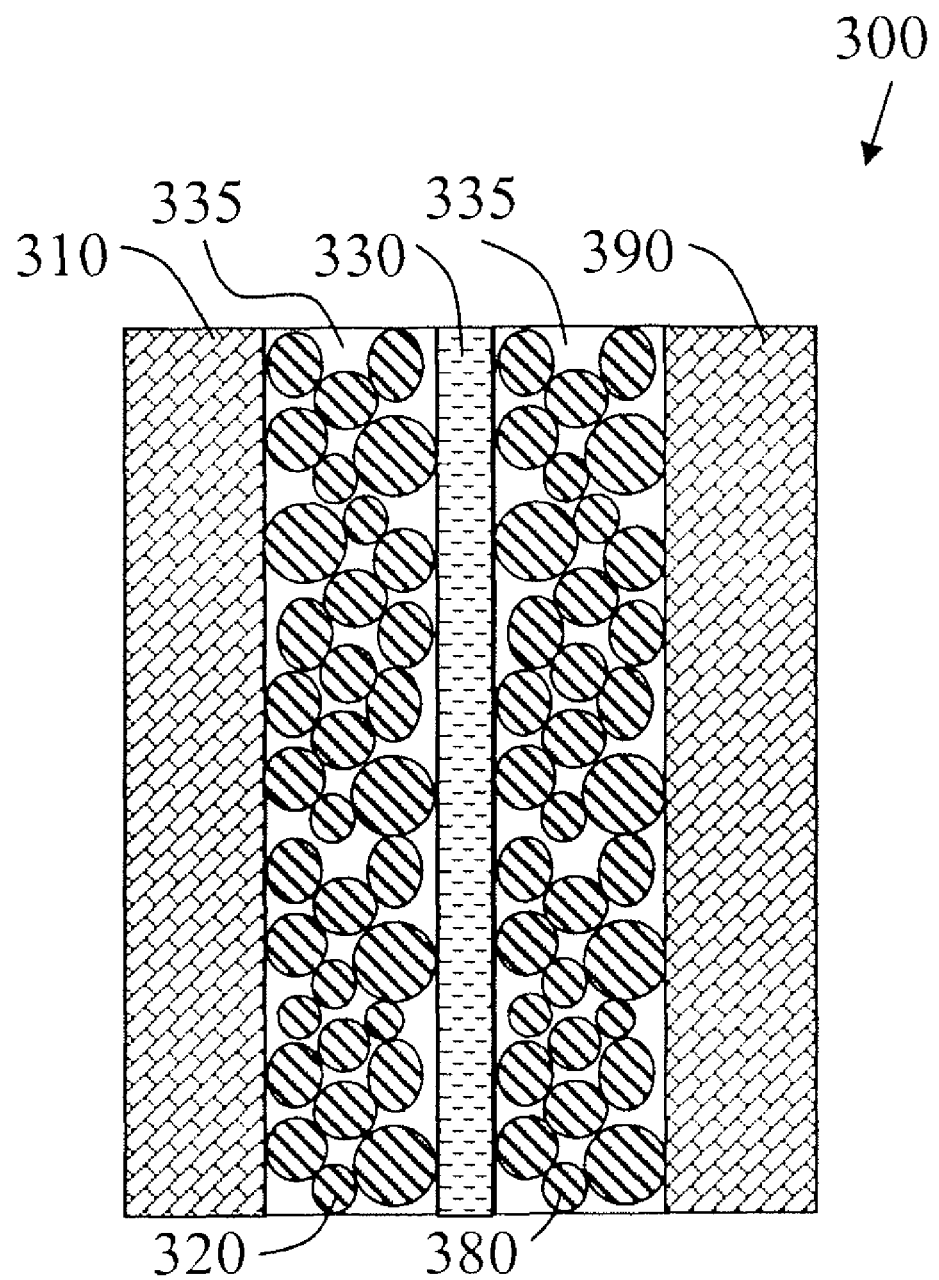
FIG. 3 is a cross-sectional representation of a capacitor, according to embodiments of the invention.

FIG. 3 shows a schematic representation of a first embodiment of an EDLC which has been fabricated using electrodes made using the processes described above. The capacitor 300 comprises a first substrate 310, first activated carbon-rich particles 320, a separator 330, second activated carbon-rich particles 380, second substrate 390, and an electrolyte 335. The separator 330 is sufficiently porous to allow the electrolyte 335 to pass from one half-cell to the other. The substrates 310 and 390 may be metal foils or films; examples of metals are aluminum and copper. The substrates are otherwise known as current collectors. Together the activated carbon-rich particles make up films of carbon-rich material on the substrate surfaces. For ease of illustration, the activated carbon-rich particles 320 and 380 are shown in FIG. 3 at a low density; however, in general the density of particles will be much higher than shown and the particle size distributions may be much wider than shown. This is also true for the carbon-rich particles shown in FIGS. 4-6. The actual size of these particles is generally in the range of 50 nanometers to 100 microns, and the thickness of the films of carbon-rich material is generally in the range of 1 to 1000 microns. The electrolyte 335 typically contains lithium-based salts.

Figure 4:
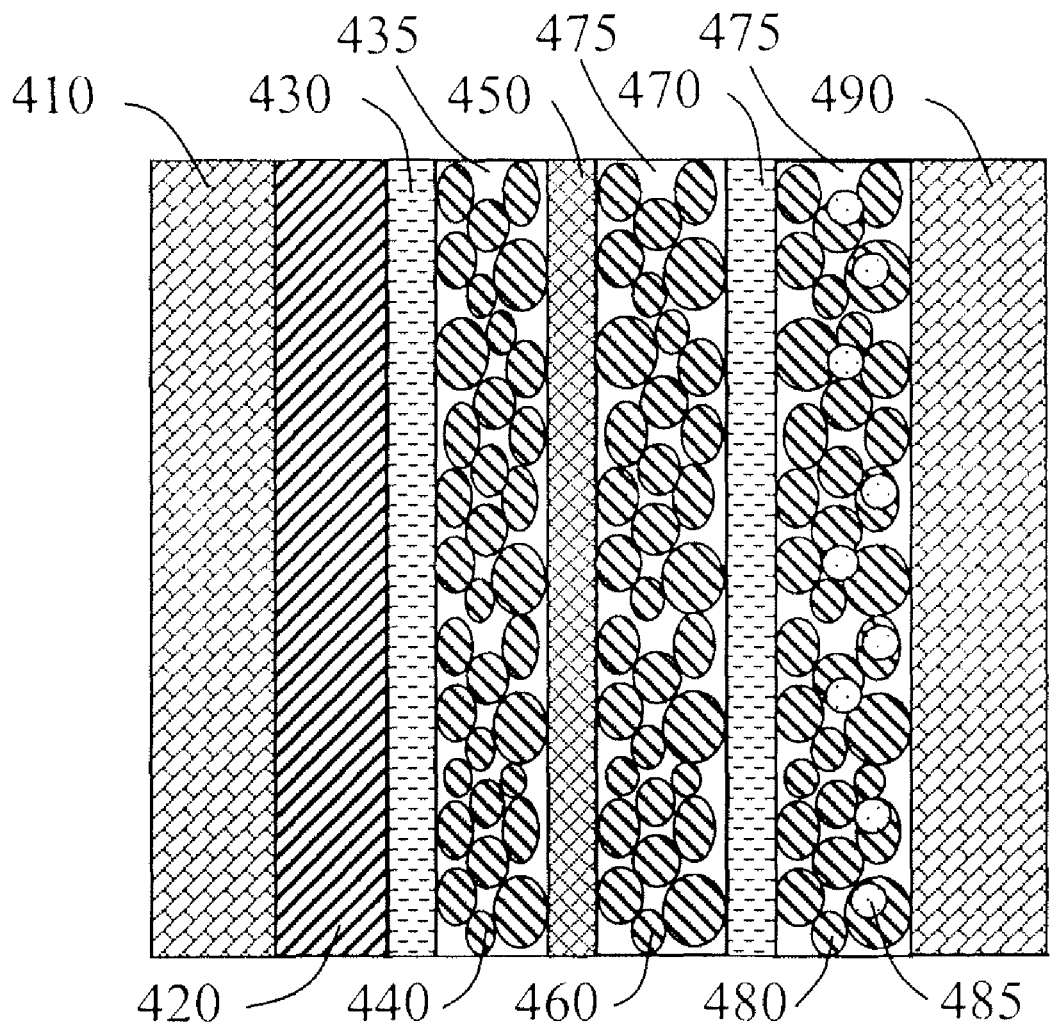
FIG. 4 is a cross-sectional representation of an asymmetric capacitor, according to a first embodiment of the invention.

A first embodiment of an asymmetric ultracapacitor designed with a two-sided carbon electrode is shown in FIG. 4. A first carbon electrode includes: a substrate 410; and a layer 420 of $LiCoO_2$, $LiMnO_2$ or similar cathode materials, typically used in Li-ion batteries. A porous separator 430 separates the first carbon electrode from the double sided carbon electrode. The double-sided carbon electrode includes: activated carbon-rich particles 440; a metal conductor 450 and activated carbon-rich particles 460. The double-sided carbon electrode needs to avoid charge accumulation which may be accomplished by the use of highly electron conducting materials. A second carbon electrode includes: activated carbon-rich particles 480 mixed with or doped with $MnO_x$, anhydrous/crystalline $RuO_2.nH_2O$, other electroactive transition metal oxides or similar electroactive nano-particles 485; and a substrate 490. Due to the dispersed particles 485, the second carbon electrode provides reversible redox pseudocapacitance, instead of electrochemical double-layer capacitance. Therefore, the second half cell exhibits both electrochemical double-layer capacitance characteristics, due to the double-sided carbon electrode, and reversible redox pseudocapacitance characteristics, due to the doped electrode. Ultracapacitors with this combination of characteristics are of particular interest since they provide higher energy density, in watt-hour per kg, than other ultracapacitors. A porous separator 470 separates the second carbon electrode from the double sided carbon electrode. The first half cell, including the first carbon electrode, contains an electrolyte 435, and the second half cell, including the second carbon half cell, contains an electrolyte 475. The first half cell provides good energy storage and the second half cell provides power capability.

Figure 5:
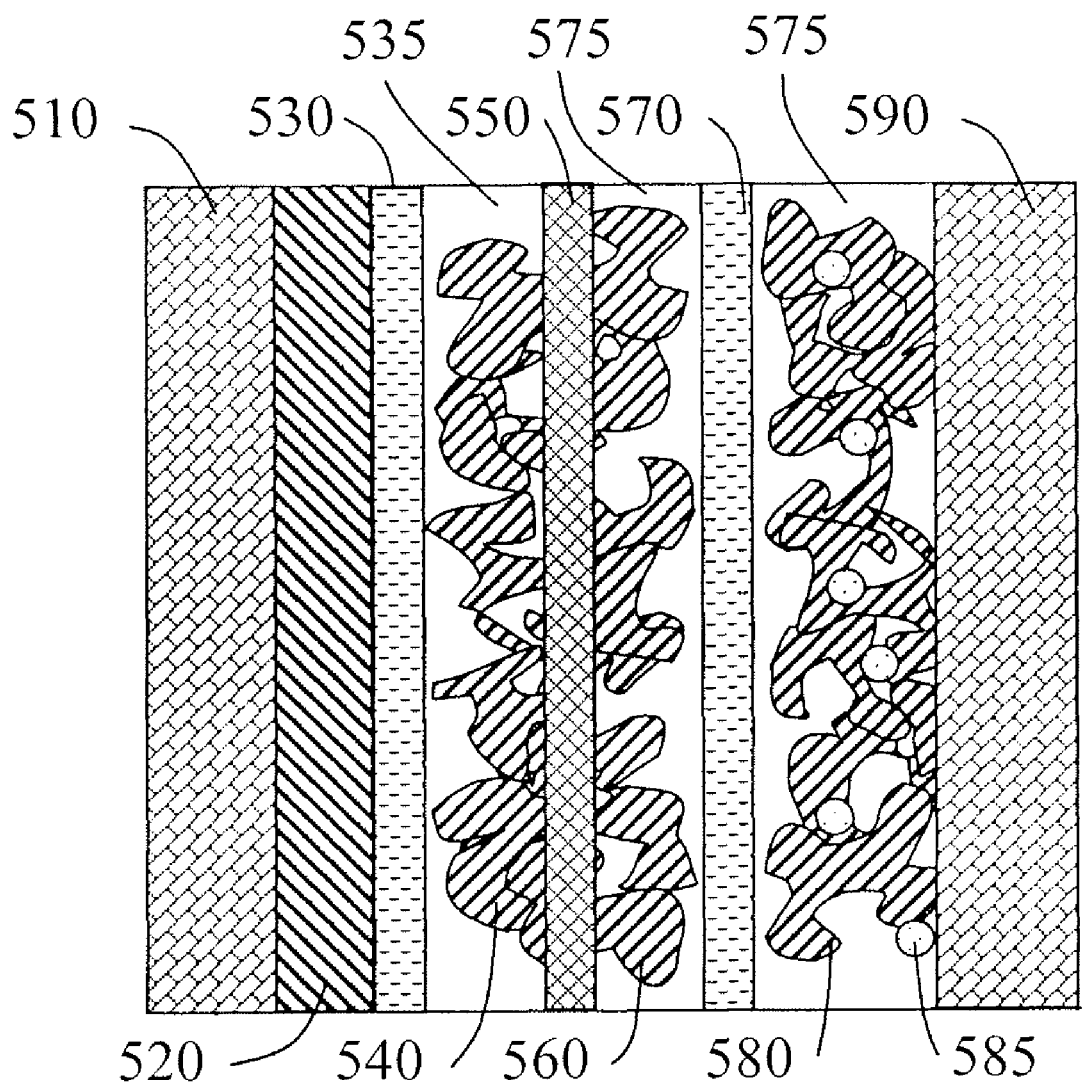
FIG. 5 is a cross-sectional representation of an asymmetric capacitor, according to a second embodiment of the invention.

A second embodiment of an asymmetric ultracapacitor designed with a two-sided carbon electrode is shown in FIG. 5. A first carbon electrode includes: a substrate 510; and a layer 520 of $LiCoO_2$, $LiMnO_2$ or similar cathode materials, typically used in Li-ion batteries. A porous separator 530 separates the first carbon electrode from the double sided carbon electrode. The double-sided carbon electrode includes: activated carbon aerogel 540; a metal conductor 550 and activated carbon aerogel 560. The double-sided carbon electrode needs to avoid charge accumulation which may be accomplished by the use of highly electron conducting materials. A second carbon electrode includes: activated carbon aerogel 580 mixed with or doped with $MnO_x$, anhydrous/crystalline $RuO_2.nH_2O$, other electroactive transition metal oxides or similar electroactive nano-particles 585; and a substrate 590. A porous separator 570 separates the second carbon electrode from the double sided carbon electrode. The first half cell, including the first carbon electrode, contains an electrolyte 535, and the second half cell, including the second carbon half cell, contains an electrolyte 575. The first half cell provides good energy storage and the second half cell provides power capability.

Figure 6:
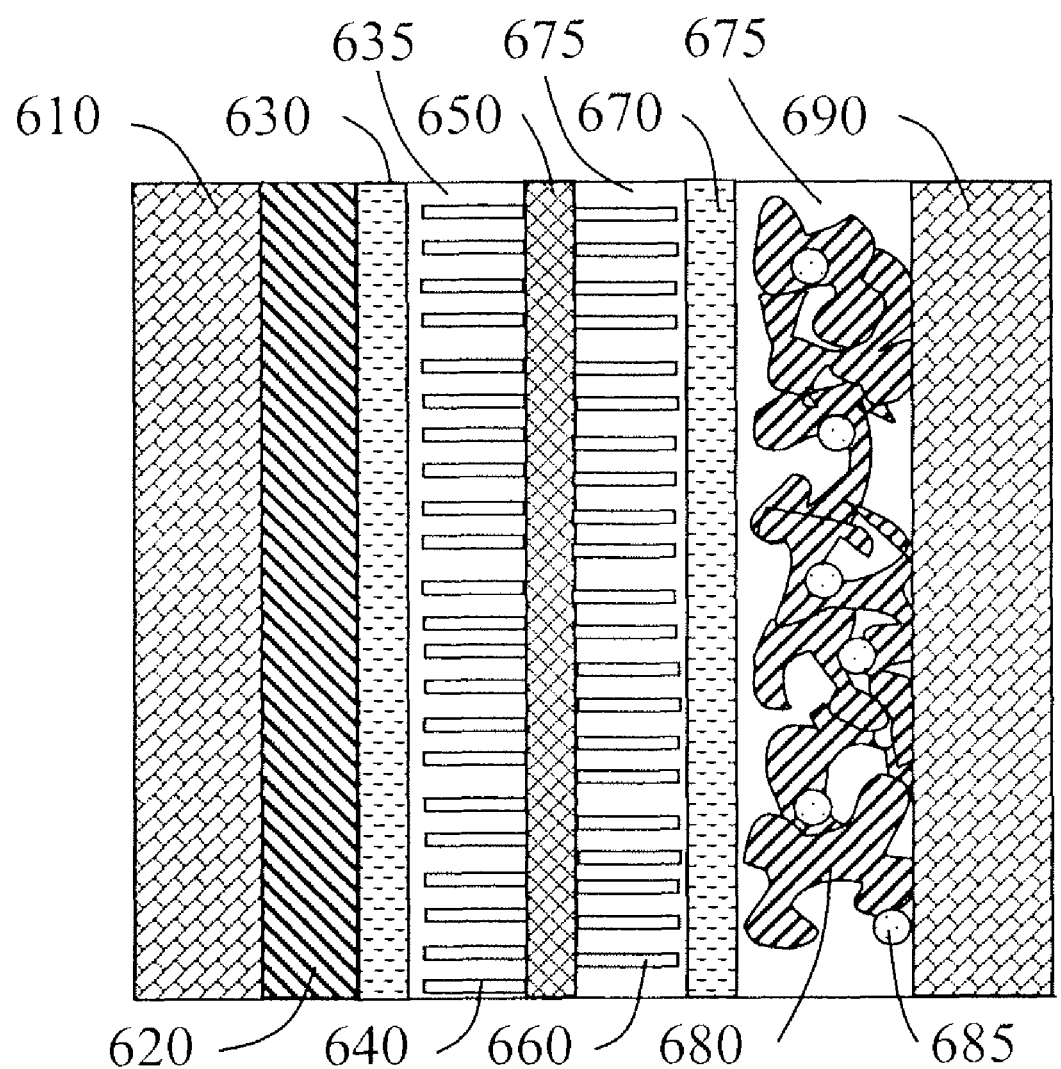
FIG. 6 is a cross-sectional representation of an asymmetric capacitor, according to a third embodiment of the invention.

A third embodiment of an asymmetric ultracapacitor designed with a two-sided carbon electrode is shown in FIG. 6. A first carbon electrode includes: a substrate 610; and a layer 620 of $LiCoO_2$, $LiMnO_2$ or similar cathode materials, typically used in Li-ion batteries. A porous separator 630 separates the first carbon electrode from the double sided carbon electrode. The double-sided carbon electrode includes: activated carbon nanotubes (CNTs) 640; a metal conductor 650 and activated CNTs 660. The double-sided carbon electrode needs to avoid charge accumulation which may be accomplished by the use of highly electron conducting materials. The double-sided carbon electrode may be fabricated by growing CNTs directly on both sides of a metal substrate. A second carbon electrode includes: activated carbon aerogel 680 mixed with or doped with $MnO_x$, anhydrous/crystalline $RuO_2 \cdot nH_2O$, other electroactive transition metal oxides or similar electroactive nano-particles 685; and a substrate 690. Due to the dispersed particles 685, the second carbon electrode provides reversible redox pseudocapacitance. A porous separator 670 separates the second carbon electrode from the double sided carbon electrode. The first half cell, including the first carbon electrode, contains an electrolyte 635, and the second half cell, including the second carbon half cell, contains an electrolyte 675. The first half cell provides good energy storage and the second half cell provides power capability.

The embodiments of the invention shown in FIGS. 3-6 show only several of many possible configurations. For example, a capacitor as in FIG. 5 can include carbon aerogel instead of activated carbon-rich particles in one half cell, alternatively an electrode may be formed with a coating of a mixture of two or more of activated carbon-rich particles, carbon aerogel, CNTs and electroactive transition metal oxides. Furthermore, the carbon electrodes within a half cell may both be doped with electroactive transition metal oxides in order to form a half cell with reversible redox pseudocapacitance; alternatively, only one electrode may be doped, in which case the half-cell will exhibit both electrochemical double layer capacitance and reversible redox pseudocapacitance characteristics. The electrolytes in the capacitors described above generally contain lithium-based salts.

The capacitors of FIGS. 3-6 may be fabricated using one of many techniques known in the art of capacitors. Furthermore, the capacitors of FIGS. 4-6 may be formed into a variety of form factors, familiar to those skilled in the art, including a cylinder. Separate electrical contacts, not shown in the figures, are made to the current collector electrodes.

The embodiments of the invention relating to processing of slurry materials described above may be extended to electrode materials used in various other battery systems where pore size distribution and porosity control are critical. These parameters affect the available surface of the electrode for ion intercalation.

Although the present invention has been particularly described with reference to embodiments thereof, it should be readily apparent to those of ordinary skill in the art that changes and modifications in the form and details may be made without departing from the spirit and scope of the invention. It is intended that the appended claims encompass such changes and modifications. The following claims define the present invention.

What is claimed is:

1. A method of manufacturing a high surface area per unit weight carbon electrode, said method comprising:
   providing a carbonized material, said providing including:
      providing a material including carbon-rich particulates;
      dispersing said material in an organic solvent to form a suspension;
      filtering said suspension to separate out non-graphitizing carbon-rich particulates;
      carbonizing said non-graphitizing carbon-rich particulates to form carbonized particulates; and
      mixing said carbonized particulates with additives to form a slurry, said additives including a binder, solvents and a pore forming additive;
   providing a substrate;
   depositing said slurry on said substrate, forming a film of said carbonized material; and
   after said depositing, activating said carbonized material to increase the surface area of said film of said carbonized material.

2. A method as in claim 1, wherein said substrate is consumed during said activating.

3. A method as in claim 2, further comprising, after said activating, depositing a metal layer on one side of the activated carbonized material, said metal layer being a current collector.

4. A method as in claim 2, wherein said substrate comprises a material chosen from the group consisting of paper, cotton and silk.

5. A method as in claim 1, wherein said substrate is a metal film, and wherein said metal film is a part of said electrode.

6. A method as in claim 1, wherein said depositing includes:
   depositing said slurry on said substrate;
   evaporating said solvents; and
   removing said binder.

7. A method as in claim 1, wherein said material including carbon-rich particulates comprises a material chosen from the group consisting of rice husks and peanut shells.

8. A method as in claim 1, wherein said material including carbon-rich particulates includes a metal oxide.

9. A method as in claim 8, wherein said metal oxide is chosen from the group consisting of manganese oxide and ruthenium oxide.

10. A method as in claim 1, wherein said depositing includes calendaring said slurry to improve the adhesion of said carbonized material to said substrate.

11. A method as in claim 1, wherein said activating includes exposing said carbonized material to carbon dioxide gas at high temperature.

12. A method as in claim 11, wherein said high temperature is less than 330 degrees centigrade.

13. A method as in claim 1, further comprising forming a capacitor.

14. A method as in claim 13, wherein said capacitor is an asymmetric capacitor.

15. A method as in claim 13, wherein said capacitor is an ultracapacitor.

16. A method of manufacturing a high surface area per unit weight carbon electrode, said method comprising:
   providing a substrate;
   depositing a carbon-rich material on said substrate, forming a film of said carbon-rich material; and
   after said depositing, activating said carbon-rich material to increase the surface area of said film of said carbon-rich material;
   wherein said activating includes exposing said carbon rich material to carbon dioxide gas at a temperature greater than 300 and less than 330 degrees centigrade.

17. The method of claim 16, wherein said substrate is an aluminum substrate.

18. A method as in claim 16, wherein said carbon-rich material includes carbon aerogel.

19. A method as in claim 16, wherein said depositing includes forming a carbon aerogel on said substrate.

20. A method as in claim 16, wherein said carbon aerogel includes a metal oxide.

* * * * *

UNITED STATES PATENT AND TRADEMARK OFFICE
CERTIFICATE OF CORRECTION

| | | |
|---|---|---|
| PATENT NO. | : 8,178,155 B2 | Page 1 of 1 |
| APPLICATION NO. | : 12/360328 | |
| DATED | : May 15, 2012 | |
| INVENTOR(S) | : Patibandla | |

It is certified that error appears in the above-identified patent and that said Letters Patent is hereby corrected as shown below:

Title Page, Item (56), under "OTHER PUBLICATIONS", delete "Nanoprous" and insert -- Nanoporous --, therefor.

IN THE SPECIFICATION

In Column 1, Line 24, delete "fond" and insert -- form --, therefor.

In Column 1, Line 49, delete "polyvinyledene," and insert -- polyvinylidene, --, therefor.

In Column 3, Lines 38-39, delete "foaming" and insert -- forming --, therefor.

In Column 5, Line 12, delete "TFH" and insert -- THF --, therefor.

Signed and Sealed this
Seventh Day of August, 2012

David J. Kappos
*Director of the United States Patent and Trademark Office*